United States Patent [19]

Passimourt et al.

[11] Patent Number: 4,812,297

[45] Date of Patent: Mar. 14, 1989

[54] PREPARATION OF N-(DICHLOROPHOSPHORYL)TRI-CHLOROPHOSPHAZENE

[75] Inventors: Nadine Passimourt, Pau; Philippe Potin, Billere, both of France

[73] Assignee: Atochem, Puteaux, France

[21] Appl. No.: 166,270

[22] Filed: Mar. 10, 1988

[30] Foreign Application Priority Data

Mar. 10, 1987 [FR] France ................... 87 03249

[51] Int. Cl.[4] .................................. C01B 25/10
[52] U.S. Cl. .................................. 423/300
[58] Field of Search ......................... 423/300

[56] References Cited

U.S. PATENT DOCUMENTS

| | | | |
|---|---|---|---|
| 3,231,327 | 1/1966 | Seglin et al. | 423/302 |
| 3,667,922 | 6/1972 | Proctor et al. | 423/300 |
| 4,377,558 | 3/1983 | De Jaeger et al. | 423/300 |
| 4,544,536 | 10/1985 | De Jaeger et al. | 423/300 |
| 4,693,876 | 9/1987 | De Jaeger et al. | 423/300 |

Primary Examiner—John Doll
Assistant Examiner—Wayne A. Langel
Attorney, Agent, or Firm—Burns, Doane, Swecker & Mathis

[57] ABSTRACT

N-(Dichlorophosphoryl)trichlorophosphazene [$P_2NOCl_5$], essentially devoid of oligomeric impurities, is improvedly and reproducibly prepared by reacting phosphorus pentachloride with ammonium chloride, advantageously stoichiometrically, wherein more than 50% by weight of the ammonium chloride is of a particle size less than 0.16 mm.

6 Claims, No Drawings

PREPARATION OF N-(DICHLOROPHOSPHORYL)TRICHLOROPHOSPHAZENE

CROSS-REFERENCE TO COMPANION APPLICATIONS

Copending applications, Ser. No. 119,195, filed Nov. 12, 1987, and Ser. No. 166,367, filed concurrently herewith and assigned to the assignee hereof. Cf. copending applications, Ser. Nos. 166,348, and 166,349, both also filed concurrently herewith and assigned to the assignee hereof.

BACKGROUND OF THE INVENTION

1. Field of the Invention:

The present invention relates to the preparation of N-(dichlorophosphoryl)trichlorophosphazene [$P_2NOCl_5$], and, more especially, to the preparation of $P_2NOCl_5$ from phosphorus pentachloride and ammonium chloride.

2. Description of the Prior Art:

U.S. Pat. No. 3,231,327 describes the preparation of N-(dichlorophosphoryl)trichlorophosphazene having the Formula (I):

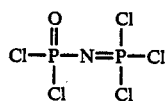

from phosphorus pentachloride and ammonium chloride, according to the following reaction scheme:

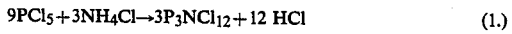

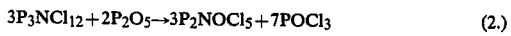

It does not appear from this '327 patent that the grain size distribution of the $NH_4Cl$ has any effect on the course of the reaction or the nature of the resulting final products. Furthermore, it is recommended to use the $NH_4Cl$ in a stoichiometric excess of approximately 10% in the reaction with $PCl_5$. It also appears, however, that the preparation of $P_2NOCl_5$ carried out without consideration of the aforementioned parameters, i.e., primarily the grain size distribution of the $NH_4Cl$ and also the molar ratio of the reagents, gives rise to extremely variable results, in particular relative to the proportion of reagents converted and, secondly, the absence of formation of linear oligomers of the type represented by the formula:

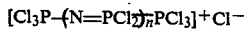

SUMMARY OF THE INVENTION

Accordingly, a major object of the present invention is the provision of an improved process for the production of N-(dichlorophosphoryl)trichlorophosphazene, which improved process is totally reproducible in producing a constant grade $P_2NOCl_5$ in contradistinction to those techniques to date characterizing the state of this art.

Another object of this invention is the provision of an improved process for the production of N-(dichlorophosphoryl)trichlorophosphazene which is characterized by a very high proportion of conversion of the reagents, i.e., at least equal to 85% and preferably higher than 95%.

Another object of the invention is the provision of an improved process for the production of $P_2NOCl_5$ at high degrees of reagent conversion, and further that the final product contains only a very small percentage of linear oligomers, desirably less than 0.5%.

Briefly, the present invention features a process for the preparation of N-(dichlorophosphoryl)trichlorophosphazene [$P_2NOCl_5$] from phosphorus pentachloride and ammonium chloride, wherein more than 50% by weight of the ammonium chloride particles have a grain size distribution of less than 0.16 mm.

DETAILED DESCRIPTION OF THE PREFERRED EMBODIMENTS OF THE INVENTION

More particularly according to the present invention, it is preferred that more than 75% by weight of the particles of $NH_4Cl$ have a grain size distribution of less than 0.16 mm.

In a preferred embodiment of the process according to the invention, the ammonium chloride is used in a predetermined grain size distribution, in an amount such that the molar ratio $PCl_5/NH_4Cl$ is essentially equal to 3.

The expression "essentially equal to 3" connotes that the reagents are preferably used in stoichiometric quantities (the ratio of 3 makes it possible to obtain both a crude yield close to 100% and a proportion of linear oligomers less than 1% by weight of the raw $P_2NOCl_5$), but that an excess of $NH_4Cl$, not exceeding 8% relative to the stoichiometry, may be used, if the presence of a proportion of oligomers of up to 10% may be tolerated.

The general conditions for the contacting of the $PCl_5$ with the $NH_4Cl$ and the subsequent treatments resulting in the production of the $P_2NOCl_5$ are known to this art. A particularly advantageous embodiment of the process according to the invention includes contacting/reacting the phosphorus pentachloride with the ammonium chloride, treating the reaction medium, containing $P_3NCl_{12}$, with $SO_2$, and separating therefrom the phosphazene of Formula I.

In another embodiment of such process, the phosphorus pentachloride is formed from $PCl_3$ and $Cl_2$.

Phosphorus oxychloride ($POCl_3$) is advantageously used as a solvent for at least a portion of the reagents. In general, the amount by weight of $POCl_3$ used ranges from 0.5 to 5 times the amount by weight of $PCl_5 + NH_4Cl$ and more advantageously from 0.8 to 2 times.

It should be noted that the use of $POCl_3$ is particularly preferred to produce a phosphazene of Formula I that is essentially devoid of higher homologs or cyclic oligomers. Obviously, it is also envisaged hereby to combine the $POCl_3$ with other solvents known for this type of reaction, such as symmetrical tetrachloroethane or chlorobenzene.

Sulfur dioxide is used to decompose the $P_3NCl_{12}$ to $P_2NOCl_5$. The amount of $SO_2$ used must, therefore, be such that the molar ratio $SO_2/PCl_5$ is at least $\frac{2}{3}$. A higher ratio may be used, but it does not appear to be advantageous to exceed a molar ratio of 1.5/1.

The reaction of the $PCl_5$ with $NH_4Cl$ is typically carried out in an inert atmosphere and at a temperature higher than 70° C. The operation is advantageously carried out under atmospheric pressure and at the reflux temperature of $POCl_3$, with the reaction medium being vigorously agitated. The duration of the reaction is on the order of several hours, for example 1 to 8 hr. Upon completion of the reaction (marked, in particular, by the cessation of the evolution of HCl), it is advantageous to lower the temperature of the reaction medium, for example to a temperature at least equal to approximately 30° C.

The value of 30° C. should be considered the maximum recommended value for producing colorless products, but in view of the practical means to evaluate coloration (optical examinations), this value may be slightly exceeded without departing from the spirit of the present invention.

Into the reaction medium, maintained at a low temperature and specifically at approximately 30° C. or lower, the $SO_2$ is introduced. This introduction is carried out at a rate such that the temperature of the reaction medium does not exceed 30° C. In a more general manner, the $SO_2$ treatment may be effected at any temperature between the melting temperature of the reaction medium and a maximum of 30° C.

The $SO_2$ is advantageously introduced progressively, over a period of 0.5 to 10 hr, and preferably 1 to 6 hr, with these values to be considered as orders of magnitude.

The reactions entailing formation and decomposition of $P_3NCl_{12}$ and the potential excess reagents used, result in the byproduction of HCl and $SO_2$, which may be eliminated simply by bubbling nitrogen through the reaction medium, or under a reduced pressure. Likewise as regards the $POCl_3$ and $SOCl_2$, which are eliminated by evaporation under reduced pressure.

Thus, the attributes of the grain size distribution of the ammonium chloride and additionally the molar ratio of the reagents are the characterizing parameters of the process of the invention, which otherwise comprehends any procedure comprising the $PCl_5/NH_4Cl$ reaction, even if the decomposition of $P_3NCl_{12}$ is effected with other than $SO_2$, such as, for example $P_2O_5$ or $SO_2$ used under conditions different from those described above.

The process according to the invention makes it possible to produce N-(dichlorophosphoryl)trichlorophosphazene with complete reproducibility. The subject process permits the realization of yields close to 100%, with the final product having a proportion of oligomers that may be less than 0.5%.

In order to further illustrate the present invention and the advantages thereof, the following specific examples are given, it being understood that same are intended only as illustrative and in nowise limitative.

EXAMPLE 1

(a) Mode of operation:
$NH_4Cl$, $PCl_5$ and $POCl_3$ were successively introduced into a reactor. The mixture was heated to the reflux temperature of the solvent and maintained under agitation at this temperature for 2 hr. The reaction mixture was present in the form of a suspension of $P_3NCl_{12}$.

The reaction mixture was cooled to 20° C. and $SO_2$ was injected into the medium, while maintaining the temperature below 20° C.

After the reaction, the residual gases (HCl and $SO_2$) were eliminated by means of a stream of nitrogen, with $POCl_3$ and $SOCl_2$ being eliminated under an absolute pressure reduced to 1 torr (temperature 60° C.-1 hr).

The balance (crude $P_2NOCl_5$) was distilled in a Vigreux column at 90° C. under 0.5 torr (absolute pressure).

(b) Quantities used:

|  | $R_1$ | $R_2$ | $R_3$ |
|---|---|---|---|
| Reactor (l) capacity | 0.5 | 2 | ⑥ |
| $PCl_5$ (g) | 313 | 1,250 | 2,400 |
| $POCl_3$ (ml) | 250 | 1,000 | 1,500 |
| $SO_2$ (g) | 100 | 300 | 600 |

(c) Grain size distribution of $NH_4Cl$ (mm):

$G_1$
32.90% 0.8 to 1 mm
44.82% 0.63 to 0.8 mm
10.60% 0.5 to 0.63 mm
5.45% 0.4 to 0.5 mm
2.11% <0.4 mm $G_2$ 17.73% >0.25 mm
57.94% 0.16 to 0.25 mm
24.13% <0.16 mm $G_3$
0.09% >0.16 mm
3.89% 0.125 to 0.16 mm
15.07% 0.1 to 0.125 mm
60.32% 0.08 to 0.1 mm
18.65% 0.04 to 0.08 mm
1.97% <0.04 mm (d) Analyses:
The raw yield was determined by weighing the crude balance noted above.

The oligomer proportion was determined by nuclear magnetic resonance, $^{31}P$ at 250 megacycles on the crude balance: it is expressed as the percentage of phosphorus contained in the different chemical species.

The yield after distillation corresponded to the sum of the weight of the head (analytically pure heads by NMR$^{31}$P) and the core, divided by the theoretical weight to be obtained.

| Examples | Quantities used | Grain sizes $NH_4Cl$ | Excess $NH_4Cl$ % | Degree of Conversion % | Oligomers % | Distillation yield % |
|---|---|---|---|---|---|---|
| INVENTION |  |  |  |  |  |  |
| 1 | $R_2$ | $G_3$ | 7.5 | 97.5 | 5.9 | 85 |
| 2 | $R_2$ | $G_3$ | 0 | 95.9 | 0.67 | 94.5 |
| 3 | $R_3$ | $G_3$ | 0 | 95.6 | 0.40 | 93.86 |
| 4 | $R_1$ | $G_3$ | 10.2 | 99.2 | 18.2 | 62.4 |
| COMPARATIVE EXAMPLES |  |  |  |  |  |  |
| a | $R_3$ | $G_1$ | 9.54 | 37.85 |  |  |
| b | $R_2$ | $G_2$ | 0 | 52.81 |  |  |

As is clearly apparent from the above table, the use of a grain size distribution notably smaller than 0.16 mm results in a degree of conversion higher than 95%.

It will also be appreciated that when such a grain size distribution is combined with a slight excess in NH₄Cl or, preferably, utilizing a molar PCl₅/NH₄Cl ratio that is essentially stoichiometric, the proportion of oligomers is decreased to very low values.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of N-(dichlorophosphoryl)trichlorophosphazene [P₂NOCl₅], comprising reacting phosphorus pentachloride with ammonium chloride, to obtain a reaction medium containing P₃NCl₁₂, and decomposing the P₃NCl₁₂ contained in said reaction medium in the presence of an oxygen donor to produce N-(dichlorophosphoryl) trichlorosphosphazene [P₂NOCl₅], and wherein more than 50% by weight of said ammonium chloride comprises particles of a size less than 0.16 mm.

2. The process as defined by claim 1, wherein more than 75% by weight of the ammonium chloride comprises particles of a size less than 0.16 mm.

3. The process as defined by claim 1, wherein the molar ratio PCl₅/NH₄Cl is essentially equal to 3.

4. The process as defined by claim 3, comprising reacting the PCl₅ with an up to 8% stoichiometric excess of NH₄Cl.

5. The process as defined by claim 1, carried out in the presence of POCl₃.

6. The process as defined by claim 5, comprising decomposing P₃NCl₁₂ with SO₂.

* * * * *